US009150707B2

(12) United States Patent
Schroeder

(10) Patent No.: US 9,150,707 B2
(45) Date of Patent: Oct. 6, 2015

(54) PROCESS FOR PRODUCING A CROSS-LINKED BITUMEN/POLYMER COMPOSITION WITH A REDUCTION IN $H_2S$ EMISSIONS

(71) Applicant: TOTAL MARKETING SERVICES, Puteaux (FR)

(72) Inventor: Soenke Schroeder, Itzehoe (DE)

(73) Assignee: Total Marketing Services, Puteaux (FR)

( * ) Notice: Subject to any disclaimer, the term of this patent is extended or adjusted under 35 U.S.C. 154(b) by 0 days.

(21) Appl. No.: 14/365,914

(22) PCT Filed: Dec. 17, 2012

(86) PCT No.: PCT/EP2012/075861
§ 371 (c)(1),
(2) Date: Jun. 16, 2014

(87) PCT Pub. No.: WO2013/092531
PCT Pub. Date: Jun. 27, 2013

(65) Prior Publication Data
US 2014/0357774 A1    Dec. 4, 2014

(30) Foreign Application Priority Data

Dec. 20, 2011    (FR) .................................... 11 61986

(51) Int. Cl.
*C08L 95/00*    (2006.01)
*E01C 7/26*    (2006.01)
(Continued)

(52) U.S. Cl.
CPC ................. *C08K 5/098* (2013.01); *C08L 95/00* (2013.01); *C08L 2555/22* (2013.01); *C08L 2555/32* (2013.01); *C08L 2555/80* (2013.01)

(58) Field of Classification Search
CPC ......... C08L 95/00; C08L 21/00; C08L 53/02; C08L 2555/22; C08L 2555/80; C08L 2555/32; C08K 5/098; C08K 3/30; C08K 5/0025; C08K 3/0016
USPC ............................... 524/59, 68, 399; 422/129
See application file for complete search history.

(56) References Cited

U.S. PATENT DOCUMENTS

| | | | |
|---|---|---|---|
| 4,145,322 | A | 3/1979 | Maldonado et al. |
| 4,242,246 | A | 12/1980 | Maldonado et al. |

(Continued)

FOREIGN PATENT DOCUMENTS

| | | | |
|---|---|---|---|
| DE | 102010035071 A1 | | 2/2012 |
| EP | 0 121 377 | * | 10/1984 |

(Continued)

OTHER PUBLICATIONS

Garcia, John; "Sulfa-Check Hydrogen Sulfide Abatement", Crude Oil Quality Group Conference, XP055035725, West Loop, Houston, Texas, Sep. 29, 2005, pp. 1-22.

(Continued)

*Primary Examiner* — William Cheung
(74) *Attorney, Agent, or Firm* — Harness, Dickey & Pierce, P.L.C.

(57) ABSTRACT

A process for producing a cross-linked bitumen/polymer composition (PmB) with a reduction in hydrogen sulphide (H2S) emissions including a production unit for the implementation of such a process. The production process includes the following successive steps:
(a) preparing a cross-linked bitumen/polymer composition (PmB) in a reactor and,
(b) transferring a predetermined quantity of the composition from the reactor to a storage tank and/or directly to a loading station via a distribution line, the composition being maintained at a temperature between 100° C. and 220° C. during the transfer. A reduction in hydrogen sulphide emissions (H2S) is carried out by the in-line injection of an effective quantity of a hydrogen sulphide (H2S) scavenger during the transfer step. The injection is carried out by continuous introduction of the hydrogen sulphide (H2S) scavenger into the distribution line downstream of the reactor and, upstream of the storage tank and the loading station.

18 Claims, 1 Drawing Sheet

(51) Int. Cl.
  *C08K 5/00* (2006.01)
  *B01J 10/00* (2006.01)
  *C08K 5/098* (2006.01)

(56) References Cited

U.S. PATENT DOCUMENTS

| | | | |
|---|---|---|---|
| 4,567,222 | A | 1/1986 | Hagenbach et al. |
| 5,000,835 | A | 3/1991 | Taylor et al. |
| 5,120,777 | A | 6/1992 | Chaverot et al. |
| 5,277,250 | A | 1/1994 | Dela |
| 5,558,704 | A | 9/1996 | Masuda et al. |
| 5,874,492 | A | 2/1999 | Planche et al. |
| 6,020,404 | A | 2/2000 | Planche et al. |
| 6,057,390 | A | 5/2000 | Loza et al. |
| 7,918,930 | B2 | 4/2011 | Lapalu et al. |
| 7,931,744 | B2 | 4/2011 | Chaverot et al. |
| 8,202,922 | B2 | 6/2012 | Botel et al. |
| 8,748,517 | B2 | 6/2014 | Harders et al. |
| 2005/0145137 | A1 | 7/2005 | Buras et al. |
| 2008/0308007 | A1 | 12/2008 | Lapalu et al. |
| 2009/0149577 | A1* | 6/2009 | Butler et al. .......... 524/68 |
| 2009/0242461 | A1 | 10/2009 | Eldin et al. |
| 2010/0154674 | A1 | 6/2010 | Chaverot et al. |
| 2010/0192804 | A1 | 8/2010 | Lapalu et al. |
| 2011/0098385 | A1 | 4/2011 | Botel et al. |
| 2011/0130298 | A1 | 6/2011 | Gonzalez et al. |
| 2011/0257318 | A1 | 10/2011 | Neuville et al. |
| 2011/0306729 | A1 | 12/2011 | Dreessen et al. |
| 2012/0060722 | A1 | 3/2012 | Montpeyroux et al. |
| 2012/0283365 | A1 | 11/2012 | Harders et al. |
| 2013/0131229 | A1 | 5/2013 | Harders et al. |
| 2013/0298800 | A1 | 11/2013 | Lapalu et al. |
| 2014/0024735 | A1 | 1/2014 | Harders et al. |

FOREIGN PATENT DOCUMENTS

| | | |
|---|---|---|
| EP | 0360656 A1 | 3/1990 |
| FR | 2965271 A1 | 3/2012 |
| WO | WO-2004058897 A1 | 7/2004 |
| WO | WO-2004060991 A2 | 7/2004 |
| WO | WO 2005/065177 A2 * | 7/2005 |
| WO | WO-2005065177 A2 | 7/2005 |
| WO | WO-2008077888 A1 | 7/2008 |

OTHER PUBLICATIONS

Plant for Modified Bitumen Production Consisting of One Skid Structure, XP055035721, Nov. 19, 2007, pp. 1-4.
Nicholson, Mike et al.; "Hydrogen Sulfide in Petroleum," XP055035724, Jun. 17, 2009, pp. 1-28.

\* cited by examiner

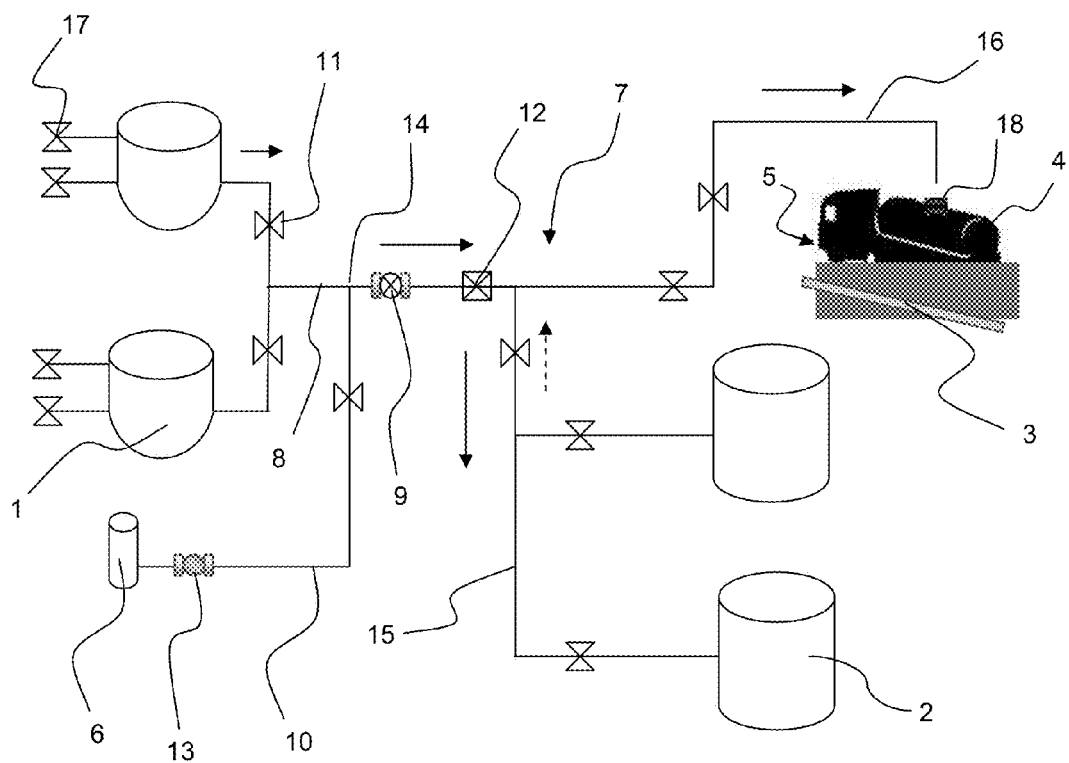

PROCESS FOR PRODUCING A CROSS-LINKED BITUMEN/POLYMER COMPOSITION WITH A REDUCTION IN $H_2S$ EMISSIONS

CROSS-REFERENCE TO RELATED APPLICATIONS

This application is a National Phase Entry of International Application No. PCT/EP2012/075861, filed on Dec. 17, 2012, which claims priority to French Patent Application Serial No. 1161986, filed on Dec. 20, 2011, both of which are incorporated by reference herein.

TECHNICAL FIELD

The present invention belongs to the field of cross-linked bitumen/polymer compositions. More specifically, it relates to a process for producing a cross-linked bitumen/polymer composition with a reduction in hydrogen sulphide ($H_2S$) emissions. The invention also relates to a production unit for the implementation of such a process.

BACKGROUND

The use of bitumen in the manufacture of materials for highway and industrial applications has been known for a long time: bitumen is the main hydrocarbon binder used in the field of road construction or civil engineering. To be able to be used as a binder in these different applications, the bitumen must have certain mechanical properties, and in particular elastic or cohesive properties. The mechanical properties of the bituminous compositions are determined by standardized tests of the different mechanical characteristics such as the softening point, the penetrability and the rheological characteristics in defined traction.

In general, the conventional bitumens do not simultaneously have all of the required qualities and it has been known for a long time that the addition of various polymers to these conventional bitumens makes it possible to favourably modify the mechanical properties of the latter and to form bitumen-polymer compositions having improved mechanical qualities compared with those of the bitumens alone. The polymers capable of being added to the bitumens are most often elastomers. Among the polymers added to bitumens, random or block copolymers of an aromatic monovinyl hydrocarbon and a conjugated diene and in particular of styrene and butadiene or of styrene and isoprene are particularly effective as they dissolve very easily in the bitumens and confer upon them excellent mechanical and dynamic properties and in particular very good viscoelastic properties.

It is also known that the stability of the bitumen/polymer compositions can be improved by chemical coupling of the polymer with the bitumen, this improvement moreover making it possible to extend the field of use of the bitumen-polymer compositions. The chemical coupling of the polymer with the bitumen consists of cross-linking the polymer by means of a cross-linking agent, in a standard fashion, a sulphur-donor compound. Bitumen-polymer compositions for which a random or block copolymer of styrene and a conjugated diene such as butadiene or isoprene is coupled with the bitumen can be prepared using the processes described in the citations FR-A-2376188, FR-A-2429241, FR-A-2528439 and EP-A-0360656. In these processes, the source of sulphur consists of chemically non-bound sulphur (FR-A-2376188 and FR-A-2429241), in a polysulphide (FR-A-2528439) or in a sulphur-donor vulcanization accelerator used alone or in combination with chemically non-bound sulphur and/or a polysulphide or a non-sulphur-donor vulcanization accelerator (EP-A-0360656).

The cross-linked bitumen/polymer compositions thus obtained are known by the acronym "PmB", for Polymer-modified Bitumen or "PmA" for Polymer-modified Asphalt. The cross-linking of the bitumen/polymer compositions confers upon them very good properties in terms of storage stability, cohesion, elongation capacity and resistance to ageing.

However, the use of sulphur-donor cross-linking agent, in particular, the use of elemental sulphur for the cross-linking step leads to a significant emission of hydrogen sulphide, denoted $H_2S$, during the PmB production process. Hydrogen sulphide ($H_2S$) is a colourless and toxic gas, having a characteristic odour at a very low concentration. In the PmB production units, the concentration of $H_2S$ released during the manufacture of a cross-linked bitumen/polymer composition is particularly significant. The release of $H_2S$ is much greater for the cross-linked bitumen/polymer compositions than for bitumen bases devoid of cross-linking agent. For reasons of safety and because of environmental constraints, the reduction or even the elimination of hydrogen sulphide emissions during the production of PmB constitutes a crucial industrial challenge.

Solutions have been proposed in the literature for reducing hydrogen sulphide emissions during the manufacture of PmB. In particular, the addition of an agent capable of scavenging hydrogen sulphide ($H_2S$) during the cross-linking of bitumen/polymer compositions has been proposed in order to find a solution to this drawback. By way of example, there may be mentioned the organic or inorganic metal salts described in the international application WO2005065177 as agents capable of scavenging $H_2S$. The process implemented for reducing the release of $H_2S$ consists of introducing an organic or inorganic metal salt dissolved in bitumen into a reactor containing a previously mixed bitumen/polymer composition. The metal salt added in mass into the reactor, is then stirred in the reactor during the cross-linking reaction.

SUMMARY

The subject of the present invention is to improve the process for producing a cross-linked bitumen/polymer composition described in the prior art, in particular in terms of reducing the hydrogen sulphide emissions. Another subject consists of proposing a process for producing a cross-linked bitumen/polymer composition, suitable for an industrial production and corresponding to safety requirements and environmental constraints. In particular, the aim of the invention is to reduce the $H_2S$ emissions of a cross-linked bitumen/polymer composition to an acceptable level in terms of safety and respect for the environment, in particular to reduce the release of $H_2S$ during the loading and/or unloading of such a composition. Another aim of the invention is to propose a production unit for the implementation of such a process.

According to the invention, this aim is achieved by the fact that the process for producing a cross-linked bitumen/polymer composition comprises the following successive steps:

(i) preparation of a cross-linked bitumen/polymer composition (PmB) in a reactor and, (ii) transfer of a predetermined quantity of said composition from the reactor to a storage tank and/or directly to a loading station via a distribution line, said composition being maintained at a temperature comprised between 100° C. and 220° C., preferably between 120° C. and 190° C., more preferentially between 140° C. and 190° C., even more preferentially between 160° C. and 190° C., during said transfer, and due to the fact that a reduction in hydrogen sulphide ($H_2S$) emissions is carried out by the in-line injection of an effective quantity of a hydrogen sulphide ($H_2S$) scavenger during the transfer step (ii), said injection being carried out by continuous introduction of said hydrogen sulphide ($H_2S$) scavenger into the distribution line downstream of the reactor and, upstream of the storage tank and the loading station.

In particular, this aim is achieved by the fact that the distribution line comprises a transfer pump capable of generating a turbulent flow and due to the fact that the in-line injection is carried out upstream of the transfer pump. According to a preferred embodiment, the mass ratio of hydrogen sulphide ($H_2S$) scavenger injected in-line relative to the predetermined quantity of the cross-linked bitumen/polymer composition (PmB) is comprised between 0.05% and 0.4%, preferably between 0.1 and 0.35%, more preferentially between 0.15% and 0.3%. According to a particular embodiment, the hydrogen sulphide ($H_2S$) scavenger is chosen from the organic metal salts, the inorganic metal salts and mixtures thereof, preferably from the group consisting of the metal salts of carboxylates, oxides, naphthenates, sulphonates and mixtures thereof, more preferentially from the metal salts of carboxylates, in particular, zinc carboxylates.

According to another particular embodiment, the transfer consists of unloading from the reactor the determined quantity of cross-linked bitumen/polymer composition (PmB) in the form of a channeled flow via the distribution line. The introduction of the hydrogen sulphide ($H_2S$) scavenger is carried out from the start of said flow and in an uninterrupted manner up to the end of said flow.

According to a particular development of the invention, the preparation of the cross-linked bitumen/polymer composition (PmB) comprises:

the mixing in the reactor of 90% to 99.7%, preferably 94% to 99% by mass of a bitumen base and 0.7% to 10%, preferably 1% to 6% by mass of an elastomeric polymer, at a temperature comprised between 90° C. and 220° C., preferably between 140° C. and 190° C., until a homogeneous bitumen/polymer mixture is obtained, the cross-linking of said bitumen/polymer mixture by the addition of 0.05 to 5% by mass of a sulphur-donor cross-linking agent and heating at a cross-linking temperature comprised between 160° C. and 195° C. for at least 15 minutes, the mass percentages being calculated relative to the total mass of the cross-linked bitumen/polymer composition (PmB) thus obtained.

According to another development of the invention, the sulphur-donor cross-linking agent is chosen from the group consisting of elemental sulphur, hydrocarbyl polysulphides, sulphur-donor vulcanization accelerators and mixtures thereof. According to another development of the invention, the elastomeric polymer is chosen from the random or block copolymers of an aromatic monovinyl hydrocarbon and a conjugated diene. According to another development, the process comprises a step of introduction of an effective quantity of at least one additive and/or at least one fluxing agent and/or at least one diluent into the cross-linked bitumen/polymer composition (PmB) during the transfer step, said introduction being carried out by the in-line injection into the distribution line downstream of the reactor and, upstream of the storage tank and the loading station. According to the invention, this aim is also achieved by a cross-linked bitumen/polymer composition (PmB) production unit for the implementation of such a process.

The production unit according to the invention comprises:
a reactor equipped with a stirring device and heating means,
a storage tank for said cross-linked bitumen/polymer composition (PmB),
a loading station intended for the loading of said cross-linked bitumen/polymer compositions (PmB) into at least one tank of a means of transport and,
means for transferring said composition (PmB) from the reactor to the loading station and/or to the storage tank. The unit also comprises a tank intended to contain an $H_2S$ scavenger. The transfer means comprise a distribution line equipped with a transfer pump capable of generating a turbulent flow. The $H_2S$ scavenger tank is connected to the distribution line by connection of a branch upstream of the reactor and downstream of the transfer pump.

According to a particular development, the transfer pump is a draw-off pump equipped with at least one filter. According to another particular development, a metering pump is mounted on the branch at the tank outlet before the connection to the distribution line.

BRIEF DESCRIPTION OF THE DRAWINGS

FIG. 1 is a diagrammatic view representing a cross-linked bitumen/polymer composition production unit of the present process.

DETAILED DESCRIPTION

Other advantages and characteristics will become clearer from the description which follows. The particular embodiments of the invention are given as non-limitative examples and are shown in the single attached drawing in which FIG. 1 diagrammatically represents a cross-linked bitumen/polymer composition production unit according to a particular embodiment of the invention.

The present invention consists of producing a cross-linked bitumen/polymer composition (PmB) with a reduction in hydrogen sulphide emissions ($H_2S$). With respect to health, safety and the environment, the French Ministry of Labour imposes standards relating to the exposure of an individual to certain compounds. In particular, this Ministry has defined an exposure limit value (ELV) and an average exposure value (AEV) for each of these compounds. With regard to exposure to hydrogen sulphide ($H_2S$), the French Ministry of Labour has fixed the ELV at 15 mg/m$^3$ i.e. 10 ppm of $H_2S$ and the AEV at 7.5 mg/m$^3$ i.e. 5 ppm of $H_2S$ (value calculated over 8 hours). The criterion for acceptability of the concentrations of $H_2S$ emitted during the loading and/or unloading of PmB is, in particular, based on these ELV and AEV reference values. In the remainder of the description, for reasons of clarity we shall use the acronym PmB and the chemical formula $H_2S$ to refer to a cross-linked bitumen/polymer composition and to hydrogen sulphide respectively.

Within the context of the PmB production processes using an agent capable of neutralizing hydrogen sulphide ($H_2S$), the Applicant has discovered that the process of introduction of said agent has a surprising effect on the emission of $H_2S$ during the loading and/or unloading of PmB. More particularly, it has been discovered that the introduction of said agent by the in-line injection makes it possible to significantly reduce the $H_2S$ emissions, in comparison with the introduction in mass, carried out according to the prior art.

According to a particular embodiment shown in FIG. 1, a cross-linked bitumen/polymer composition (PmB) production unit comprises at least one reactor 1, a storage tank 2 for the PmB, a loading station 3 intended for loading said PmB into at least one tank 4 of a means of transport 5, in a standard fashion, a tank truck or a tank car. The reactor 1 has a capacity comprised, preferably, between 20 and 60 tonnes, more preferentially, between 25 and 55 tonnes. The storage tank 2 has a capacity comprised, preferably, between 20 and 300 tonnes, more preferentially, between 100 and 200 tonnes. The capacity of the tank 4 of a tank truck 5 is in a standard fashion comprised between 10 and 40 tonnes, in a standard fashion, from approximately 25 to 26 tonnes.

The loading station 3 is equipped with a walkway (not shown) on which the driver must go up in order to access the tank 4. The PmB is loaded into the tank 4 according to any known process, for example, by gravity when the loading station 3 is placed near or under the storage tank 2 or, by pumping when the station is at a distance from the storage tank 2. The production unit also comprises a tank 6 intended to contain an agent capable of neutralizing hydrogen sulphide ($H_2S$). By agent capable of neutralizing hydrogen sulphide ($H_2S$) is meant a compound or a mixture of compounds which in the presence of $H_2S$ combines with the latter so as to collect and/or scavenge it, thus reducing or eliminating the emission and/or the release of $H_2S$ at PmB storage, transfer and transport temperatures.

The storage, transfer and transport temperature range is determined by the need to keep a liquid product and pumpable. The temperature range is fixed at approximately 110° C. above the ring-and-ball temperature for modified bitumens. Moreover, it is also preferable to be able to deliver products having a temperature close to the temperatures of use in their roadway or industrial applications. The PmB storage, transfer and transport temperatures are comprised between 100° C. and 220° C., preferably between 120° C. and 190° C., more preferentially between 140° C. and 190° C., even more preferentially between 160° C. and 190° C.

For the sake of simplicity, the word "scavenger" is used in the remainder of the description to refer to the agent capable of neutralizing $H_2S$. The use of an $H_2S$ scavenger makes it possible to significantly reduce, or advantageously to eliminate, the release of $H_2S$ during the loading and/or unloading of a cross-linked bitumen/polymer composition into the tank trucks 5. The tank 6 has a sufficient capacity to provide at least the effective quantity of scavenger to reduce or eliminate the $H_2S$. The effective quantity of $H_2S$ scavenger is, in a standard fashion, comprised between 20 and 210 kg, preferably between 50 and 165 kg.

According to a preferential embodiment, the $H_2S$ scavenger is chosen from the organic metal salts, the inorganic metal salts and mixtures thereof. In fact, the organic and inorganic metal salts have proved to be particularly effective $H_2S$ scavengers for reducing $H_2S$ emissions during the production of PmB, in particular within the context of a production process implementing an introduction of said scavenger by in-line injection.

The preferred $H_2S$ scavengers are organic metal salts and inorganic metal salts of iron or zinc, preferably of zinc. The $H_2S$ scavenger is preferably, chosen from the group consisting of the metal salts of carboxylates, oxides, naphthenates, sulphonates and mixtures thereof. By way of example, there may be mentioned zinc stearate, zinc octanoate, zinc octoate, (zinc (bis(2-ethylhexanoate), zinc oxide, zinc sulphonate, iron naphthenate and mixtures thereof. The $H_2S$ scavenger is, more preferentially, chosen from the metal salts of carboxylates, advantageously zinc carboxylates.

Depending on the scale of PmB production, the production unit can comprise several reactors 1, storage tanks 2 and/or loading stations 3. A cross-linked bitumen/polymer composition (PmB) is initially prepared, according to any known process, in the reactor 1 equipped with a stirring device and heating means (not shown).

Transfer means 7 make it possible to unload a determined quantity of cross-linked bitumen/polymer composition (PmB) from the reactor 1 in the form of a flow of PmB maintained at a temperature comprised between 100° C. and 220° C., preferably between 120° C. and 190° C., more preferentially between 140° C. and 190° C., even more preferentially between 160° C. and 190° C. The flow of PmB is channeled via the transfer means 7 in order to transfer the predetermined quantity of PmB from the reactor 1 to a storage tank 2 and/or directly to the loading station 3.

The transfer means 7 comprise at least one distribution line 8 equipped with a transfer pump 9 capable of generating a turbulent flow. By turbulent flow is meant a flow in which the instantaneous speed vectors are unequal (different in direction, and intensity) thus forming whirls. Generally, turbulent flow against laminar flow where all the vectors are parallel, induces an increase in the viscosity of the fluid. The transfer pump 9 is, advantageously, a draw-off pump equipped with at least one filter.

The distribution line 8 is arranged so as to allow the transfer of the PmB to the loading station 3 and/or the storage tank 2. The distribution line 8 is also used for unloading a determined quantity of PmB from the storage tank 2 towards the loading station 3. In this case, the flow of PmB is represented by the dotted arrow in FIG. 1. The determined quantity of PmB corresponds to the quantity of PmB to be transferred and will depend in particular on the capacity of the tank 4 and/or of the storage tank 2.

The $H_2S$ scavenger tank 6 is connected to the distribution line 8 by connecting a branch 10 upstream of the reactor 1 and downstream of the transfer pump 9. The terms upstream and downstream are defined with respect to the direction of flow of the PmB represented by the solid arrows in FIG. 1. The distribution line 8 can, advantageously, comprise one or more valves and/or heat exchangers making it possible to regulate the flow of the PmB. A metering pump 13 is, preferably, mounted on the branch 10 at the tank outlet 6 before the connection to the distribution line 8 to make it possible to regulate the in-line introduction of the $H_2S$ scavenger.

As shown in FIG. 1, the distribution line 8 can be equipped with one or more solenoid valves 11 and/or one or more heat exchangers 12 which can be actuated individually. The distribution line 8 has a junction 14 separating the distribution line 8 into a first branch 15 making it possible to connect the reactor 1 to at least one storage tank 2 and a second branch 16 making it possible to connect the reactor 1 to the loading station 3. The transfer pump 9 is situated on the distribution line 8 upstream of the junction 14.

The production unit preferably comprises a device for controlling the flow rate and temperature of the PmB and of the $H_2S$ scavenger. The control device comprises, in particular, a mechanical and/or electronic system capable of actuating the valves 11, the heat exchangers 12 and/or the metering pump 13. The control device thus makes it possible to program the conditions for the transfer of the PmB from the reactor 1 towards the storage tank 2 and/or from the reactor 1 towards the loading station 3 and/or from the storage tank 2 towards the loading station 3. Moreover, the control device makes it possible, in particular, to apply specific settings in terms of temperature and quantity of $H_2S$ scavenger to be injected in-line according to the predetermined quantity of PmB to be transferred, the nature of the $H_2S$ scavenger and of the PmB.

According to a preferred embodiment, the preparation of the PmB comprises mixing in the reactor 1, a bitumen base and an elastomeric polymer at a temperature comprised between 90° C. and 220° C., preferably between 140° C. and 190° C., more preferentially between 170° C. and 190° C. The bitumen base used in the process of the invention comprises one or more bitumens of different origins. There may be mentioned firstly the bitumens of natural origin, those contained in deposits of natural bitumen, natural asphalt or bituminous sands.

The bitumens can be a bitumen originating from the refining of crude oil. The bitumens originate from the atmospheric and/or vacuum distillation of oil. These bitumens can be optionally blown, visbroken and/or deasphalted. The bitumens can be bitumens of hard or soft grade. The different bitumens obtained by the refining processes can be combined with each other in order to obtain the best technical compromise. The bitumens used can also be bitumens fluxed by adding volatile solvents, fluxes of petroleum origin, carbochemical fluxes and/or fluxes of vegetable origin.

The bitumens are, advantageously, chosen from road-surface bitumens of classes 10/20 to 160/220 and special bitumens of all classes. The preferred proportions of the bitumen base present in the bitumen/polymer mixture represent between 90% and 99.3% by mass, preferably between 94% and 99% by mass. The mass percentages are calculated relative to the total mass of the polymer/bitumen mixture.

The elastomeric polymers which can be used in the process according to the invention are the polymers which can be cross-linked so as to form a network improving the rheological properties of the bitumen/polymer mixture. There may be mentioned, by way of example, the polybutadienes, polyisoprenes, butyl rubbers, polyacrylates, polymethacrylates, polychloroprenes, polynorbornenes, polybutenes, polyisobutenes, polyolefins such as polyethylenes or high density polyethylenes, polypropylenes, ethylene and vinyl acetate copolymers, ethylene and methyl acrylate copolymers, ethylene and butyl acrylate copolymers, ethylene and maleic anhydride copolymers, ethylene and glycidyl methacrylate copolymers, ethylene and glycidyl acrylate copolymers, ethylene and propene copolymers, ethylene/propene/diene (EPDM) terpolymers, acrylonitrile/butadiene/styrene (ABS) terpolymers, ethylene/acrylate or alkyl methacrylate/glycidyl acrylate or methacrylate terpolymers and in particular ethylene/methyl acrylate/glycidyl methacrylate terpolymer and ethylene/alkyl acrylate or methacrylate/maleic anhydride terpolymers and in particular ethylene/butyl acrylate/maleic anhydride terpolymer. The polymers can also be the polymers described in the Applicant company's patents EP-A-1572807, EP-A-0837909 and EP-A-1576058.

The elastomeric polymer is advantageously chosen from the random or block copolymers of styrene and a conjugated diene such as butadiene, isoprene, chloroprene, carboxylated butadiene, carboxylated isoprene, and more particularly, consists of one or more copolymers chosen from block copolymers, with or without a random hinge, of styrene and butadiene, of styrene and isoprene, of styrene and chloroprene, of styrene and carboxylated butadiene or also of styrene and carboxylated isoprene. The styrene and conjugated diene copolymer and, in particular, each of the aforementioned polymers advantageously has a styrene content ranging from 5% to 50% by weight with respect to the copolymer. The weight-average molecular weight of the styrene and conjugated diene copolymer, and in particular that of the copolymers mentioned above, can be comprised, for example, between 10 000 and 600 000 Daltons and preferably between 30 000 and 400 000 Daltons.

A preferred polymer is a copolymer based on butadiene units and styrene units such as the styrene/butadiene block copolymer SB or the styrene/butadiene/styrene block copolymer SBS. The preferred proportions of the elastomeric polymer present in the bitumen/polymer mixture represent between 0.7% and 10% by mass, preferably, between 1 and 6% by mass. The mass percentages are calculated relative to the total mass of the polymer/bitumen mixture.

The bitumen/polymer mixture thus formed is maintained at this temperature under stirring until a homogeneous bitumen/polymer mixture is obtained. The duration of this step depends on several factors, in particular, on the molecular mass of the elastomeric polymer to be dissolved in the bitumen base and on the initial chemical composition of the bitumen base.

A sulphur-donor cross-linking agent is then added to the bitumen/polymer mixture and causes the cross-linking of the elastomeric polymer within the bitumen matrix. The cross-linking of the bitumen/polymer mixture is carried out under stirring, by heating at a cross-linking temperature comprised between 160 and 195° C. for at least 15 minutes. The quantity of sulphur-donor cross-linking agent is preferably comprised between 0.05% to 5% by mass, more preferentially between 0.05 and 0.5% by mass. The mass percentages are calculated relative to the total mass of the cross-linked bitumen/polymer composition (PmB).

The sulphur-donor cross-linking agent is, advantageously, chosen from the group consisting of elemental sulphur, the hydrocarbyl polysulphides, sulphur-donor vulcanization accelerators and mixtures thereof. The elemental sulphur capable of being used to constitute, all or part, of the cross-linking agent is advantageously flowers of sulphur and, preferably, crystallized sulphur in orthorhombic form known by the name of alpha sulphur. The hydrocarbyl polysulphides capable of being used to form a part or all of the cross-linking agent can be chosen from those which are defined in the Patent Application FR-A-2528439.

The sulphur-donor vulcanization accelerators can be chosen from mercaptobenzothiazole (MBT), the thiurams, thiuram polysulphides, alkylphenol disulphides, disulphides, dithiocarbamates and their derivatives. For more details on the vulcanization accelerators which can be used as or in the constitution of the cross-linking agent, reference can be made, by way of example, to the citations EP-A-0360656, EP-A-0409683 and EP-A-0582703 the content of which is incorporated in the present description by way of reference, as is the content of the citation FR-A-2528439.

For this PmB preparation step, the bitumen base, the polymer and the cross-linking agent are introduced successively or simultaneously into the reactor 1 through one or more inlets 17 situated upstream of the reactor 1. The PmB thus prepared can then be transferred from the reactor 1 to a storage tank 2 and/or directly to a loading station 3 via the distribution line 8. The transfer is intended to fill one or more storage tanks 2 and/or one or more tank trucks 5. The loading of the PmB into a tank truck 5 is carried out in a standard fashion via the hatch 18 of the tank 4. During the transfer, the PmB is maintained at a temperature comprised between 100° C. and 220° C., preferably between 120° C. and 190° C., more preferentially between 140° C. and 190° C., even more preferentially between 160° C. and 190° C.

The reduction in hydrogen sulphide emissions ($H_2S$) is carried out by the in-line injection of an effective quantity of an $H_2S$ scavenger, during the transfer step of a predetermined quantity of the cross-linked bitumen/polymer composition (PmB). The in-line injection is carried out by continuous introduction of said $H_2S$ scavenger into the distribution line 8 downstream of the reactor 1 and, upstream of the storage tank 2 and the loading station 3. Moreover, the in-line injection is advantageously carried out upstream of the transfer pump 9 so as to introduce the H₂S scavenger under a turbulent regime and to improve its reactivity.

The introduction of the H₂S scavenger is carried out, advantageously, from the start of the flow and in an uninterrupted manner up to the end of the flow. In order to do this, the metering pump 13 is actuated then stopped at the same time as the transfer pump 9, at the start and at the end of the transfer respectively. The H₂S scavenger is preferably introduced into the distribution line 8 via the branch 10 before the transfer pump 9 in order to promote the mixing of the H₂S scavenger in the PmB. In order to guarantee the continuous treatment of the H₂S throughout the entire flow, the metering pump 13 is actuated, preferably, slightly before the transfer pump 9 at the start of the transfer then stopped slightly after the transfer pump 9 at the end of the treatment.

The quantity of H₂S scavenger to be injected in-line is calculated beforehand as a function of the quantity of the cross-linked bitumen/polymer composition (PmB) to be unloaded from the reactor 1 towards the storage tank 2 and/or the loading station 3. A system for supervision of the transfers of PmB towards the storage tank or tanks 2 and/or towards the loading station or stations 3 can be developed according to any known process. The system for supervision of the transfers of PmB determines, in particular, the flow rate of H₂S scavenger injected in-line as function of several parameters, in particular, the quantity of PmB transferred, the effectiveness of H₂S scavenger and the temperature of the flow of PmB originating from the reactor 1. The temperature of the flow of PmB in particular has a significant influence on the quantity of H₂S emitted, a higher temperature producing a higher emission of H₂S. The mass ratio of H₂S scavenger injected in-line compared with the predetermined quantity of cross-linked bitumen/polymer composition (PmB) is advantageously comprised between 0.10% and 0.35%, preferably between 0.2 and 0.3%.

According to another particular embodiment, the process for producing a cross-linked bitumen/polymer composition (PmB) advantageously comprises a step of introduction of an effective quantity of at least one additive and/or at least one fluxing agent and/or at least one diluent into the cross-linked bitumen/polymer composition (PmB) during the transfer step. The additive and/or the fluxing agent and/or the diluent can be introduced separately or simultaneously via an independent connection on the distribution line 8. As for the H₂S scavenger, the introduction is carried out by in-line injection into the distribution line 8 downstream of the reactor 1 and upstream of the storage tank 2 and the loading station 3. The in-line injection of the additive and/or the fluxing agent and/or the diluent is advantageously carried out upstream of the transfer pump 9.

The production unit comprises, for example, an additional connection constituted by a tank/pump/branch assembly identical to that of the in-line injection of H₂S scavenger (tank 6/metering pump 13/branch 10). Alternatively, the same tank 6/metering pump 13/branch 10 assembly used to introduce the H₂S scavenger can also serve to introduce in-line the additive and/or the fluxing agent and/or the diluent separately or in a mixture. A mixture of additive, fluxing agent, diluent and/or H₂S scavenger can be introduced at the same time providing that each of the constituents of said mixture is inert vis-à-vis the other constituents of the mixture. The mixture of the additive, fluxing agent, diluent and/or H₂S scavenger can be produced according to any known process, for example, by simple addition of the constituents of the mixture into the single tank 6.

The quantity of additive and/or fluxing agent and/or diluent injected in-line depends on the final use of the PmB on-site and can vary between 0.1% and 40%, more particularly between 0.1% and 30% by mass with respect to the PmB. The selected additives are those commonly used to reduce the implementation and compacting temperatures of the mixes and the asphalts formulated from these PmBs. The in-line injection of these additives advantageously makes it possible to reduce the release of combustion gases, emissions of fumes and of H₂S.

The additive is preferably chosen from the group constituted by the natural resins of vegetable origin, resinous compounds based on Tall Oil in its different forms (crude, fatty acid, resinic acid or pitch), Fischer-Tropsch type waxes, waxes of fatty acid esters of synthetic, vegetable or fossil origin and mixtures thereof. For more details on the resinous compounds based on Tall Oil which can be used as additives, reference can be made, by way of example, to the Application WO2010/134024 the content of which is incorporated in the present description by way of reference.

The additive can also be selected to improve the mechanical, elastic or rheological properties of the PmB or to facilitate the implementation of the PmB. The additive is advantageously chosen from the group constituted by the organogelling compounds, polyamines, phosphoric acids, polyphosphoric acids, polyolefins optionally substituted by an epoxy group or carboxylic acid, succinic anhydride derivatives and mixtures thereof, for example the reaction product of succinic anhydride polyisobutylene and a polyamine. For examples of organogelling compounds, reference can be made to the Application WO2008/107551 the content of which is incorporated in the present description by way of reference. For more details on the succinic anhydride derivatives which can be used as additives, reference can be made, by way of example, to the citations FR-A-201057845 and PCT/IB2011/054241 the content of which is incorporated in the present description by way of reference.

The fluxing agent is preferably chosen from the hydrocarbon oils having a distillation range at atmospheric pressure determined according to the standard ASTM D 86-67, comprised between 100 and 450° C. and more especially between 150 and 400° C. This hydrocarbon oil which can be in particular a petroleum cut of aromatic nature, a petroleum cut of naphtheno-aromatic nature, a petroleum cut of naphtheno-paraffinic nature, a petroleum cut of paraffinic nature or a coal-derived oil. This hydrocarbon oil is sufficiently "heavy" to limit the evaporation when it is added to the PmB and at the same time sufficiently "light" to be removed for the maximum amount after spreading of the PmB containing it, so as to recover the same mechanical properties than the PmB prepared without use of fluxing agent after being hot spreading.

It is also possible to use a vegetable fluxing agent or a mixture of at least one vegetable fluxing agent with at least one petroleum hydrocarbon oil. By way of example, there may be mentioned the Application WO2008/077888 the content of which is incorporated in the present description by way of reference. The diluent can be a bitumen or a mixture of bitumens as described previously. In the latter case, the PmB prepared in the reactor 1 is a concentrated PmB intended to be diluted.

The cross-linked bitumen/polymer compositions (PmB) directly obtained by the production process according to the invention have remarkable properties in terms of storage stability, cohesion, elongation capacity and resistance to ageing, while guaranteeing reduced H₂S emission and release corresponding to administrative safety requirements. The compositions obtained by the process according to the invention are particularly appropriate candidates for the manufacture of bituminous binders, which can be implemented as they are, in anhydrous form, in the form of emulsion or in the form of fluxed bitumens. These bituminous binders can then be combined in a mixture with aggregates in order to produce a surface dressing, a hot mix, a cold mix, a cold-cast mix, an emulsion gravel. The compositions obtained by the process according to the invention can be used in roadway and/or industrial applications, in order to produce a wearing course, a sealing membrane, a membrane or a prime coat.

EXAMPLES

Process for the Production of a Cross-Linked Bitumen/Polymer Composition According to the Prior Art $T_1$ (Control)

A control cross-linked bitumen/polymer composition $T_1$ is prepared according to a production process in which the $H_2S$ scavenger is introduced in mass into a reactor 1 equipped with a stirring device and heating means before the transfer step. The production process comprises a first step of preparation of 52 tonnes of a cross-linked bitumen/polymer composition of class 25/55-60 (according to the standard EN 14023) in a reactor having a capacity of approximately 52 tonnes.

First Step: Preparation of a Cross-Linked Bitumen/Polymer Composition

The following are introduced into the reactor:
95% by mass of a direct distillation bitumen of penetrability 40¹/₁₀ mm according to the standard NF EN 1426:
5% by mass of a styrene/butadiene block copolymer, at 25% by weight of styrene and at 75% by weight of butadiene having a molecular mass by weight, Mw of 128 000 Daltons.

The mixture is stirred at high intensity i.e. at a high level of shearing in order to obtain a homogeneous mixture at the micron scale and heated at 185° C. for approximately 4 hours. Then 0.13% by mass of sulphur (flowers of sulphur) is added. The mixture is stirred at low intensity and heated at 190° C. for 45 min.

Second Step: Treatment of the $H_2S$ Emissions and Transfer Operation

The second step consists of adding 2000 ppm of zinc octoate containing 23% of zinc (scavenger). The liquid zinc octoate is introduced in mass into the reactor 1 then the mixture is stirred while maintaining the temperature at 190° C. for 4 hours. The percentage of scavenger is calculated with respect to the 52 tonnes of cross-linked bitumen/polymer composition originating from the first step.
The quantities used are as follows: 49.3324 tonnes of bitumen, 2.6 tonnes of styrene/butadiene block copolymer, 0.0676 tonnes of sulphur and 120 liters i.e. approximately 2000 ppm of scavenger. The 52 tonnes of cross-linked bitumen/polymer compositions thus treated by the scavenger are directly transferred to the loading station 3, for loading two tank trucks 5 having a capacity of 26 m³ per tanker. Loading into the tank truck 5 is carried out in a standard fashion via the hatch 18 of the tank 4 using a loading arm (not shown). The duration of the loading is approximately 30 min.

Process for the Production of Cross-Linked Bitumen/Polymer Compositions $C_1$ and $C_2$ According to the Invention Two cross-linked bitumen/polymer compositions $C_1$ and $C_2$ according to the invention are prepared according to a production process in which the $H_2S$ scavenger is injected in-line into the distribution line downstream of the reactor 1 and upstream of the transfer pump 9. The cross-linked bitumen/polymer compositions $C_1$ and $C_2$ according to the invention are prepared according to an identical process to that of the control composition $T_1$ with the exception: of the second step, the values of the percentage of $H_2S$ scavenger and; specifically for the $C_2$ composition, the nature of the bitumen used.

Second Step: Treatment of the $H_2S$ Emissions and Transfer Operation

The second step consists of adding the scavenger by the in line injection of said scavenger downstream of the reactor 1 i.e. at the level of the outlet of reactor 1 via a metering pump 13 and upstream of the transfer pump 9. The scavenger stored in a tank 6 is injected via a bevelled injection lance. The metering pump 13 is programmed as a function of the flow rate of the cross-linked bitumen/polymer composition originating from the first step, in order to continuously inject an appropriate quantity of scavenger into the flow of PmB. The temperature of the cross-linked bitumen/polymer composition in the distribution line at the outlet of reactor 1 is approximately 177° C.

Example 1 first step: preparation of a cross-linked bitumen/polymer composition of class 25/55-60 (according to the standard EN 14023) from a bitumen of direct distillation of penetrability 40¹/₁₀ mm according to the standard NF EN 1426,
second step: treatment of the $H_2S$ emission by the in-line injection of 2900 ppm of zinc octoate (scavenger).

Example 2 first step: preparation of a cross-linked bitumen/polymer composition of class 25/25-65 (according to the standard EN 14023) from a bitumen of direct distillation of penetrability 60¹/₁₀ mm according to the standard NF EN 1426,
second step: treatment of the $H_2S$ emission by the in line injection of 2500 ppm of zinc octoate (scavenger).

As for T1, the cross-linked bitumen/polymer compositions $C_1$ and $C_2$ are directly transferred to the loading station 3, for loading two tank trucks 5 having a capacity of 26 m³ per tanker.

Measurement of the $H_2S$ Emissions

For each cross-linked bitumen/polymer composition T1, C1 and C2 contained in a tank truck 5, samples of the liquid phase and of the gas phase (head space of the tanker 4) were taken during loading then unloading of the PmB after having traveled approximately 200 km, essentially on motorways. For sampling in the phase liquid, the samples have therefore been taken at the temperature of the loaded bitumen, i.e. close to 170° C. and at the temperature of the unloaded bitumen above 160° C. The samples were analyzed by nitrogen bubbling in the cross-linked bitumen/polymer composition (PmB) followed by measuring the level of $H_2S$ trapped in the nitrogen using a Draëger tube as type gas detector.

For the gas phase, a rapid colorimetric dosimetry process is used with a sampling pump and colorimetric tubes of Gastec type, marketed by GASTEC. The samples were taken at approximately 50 cm into the gas ullage space of the tank 4 of the tank truck 5. The results are shown in the Table I below and correspond, for each composition $T_1$, $C_1$ and $C_2$, to the average values obtained for the samples of two tank trucks 5.

TABLE I

| Reference | Loading | | Unloading | |
| --- | --- | --- | --- | --- |
| | $H_2S$ liquid phase (ppm) | $H_2S$ gas phase (ppm)* | $H_2S$ liquid phase (ppm) | $H_2S$ gas phase g (ppm)* |
| $T_1$ | 73 | 380 | 81 | 1500 |
| $C_1$ | <10 | 37 | <<10 | <2 |
| $C_2$ | <1 | <1 | <1 | 1.5 |

*sampling carried out at the end of loading or before unloading

The results show that the $H_2S$ emissions are effectively reduced by the production process according to the invention. In fact, compared to the control composition $T_1$, the compositions $C_1$ and $C_2$ clearly emit less $H_2S$. In particular, the $H_2S$ emissions for $C_1$ and $C_2$ are less than 10 ppm in the liquid phase. The composition $C_2$ is a particularly low emitter of $H_2S$ with a gas and liquid phase emission of less than 5 ppm, whether on loading or unloading the tank truck 5.

The present invention is not limited to the examples described. In particular, the preparation of the PmB can be carried out using several reactors arranged according to any known process in order to allow the circulation of the products contained in said reactors at whatever step of the preparation of the PmB. One of the reactors can, for example, serve as a maturation tank. The production unit can, advantageously, comprise two reactors connected together by a pipework equipped with a mixer, for example a colloidal mill of Siefer type and arranged according to any known process so as to allow the homogenization of the bitumen/polymer and cross-linked bitumen/polymer compositions by passing through said mixer during the preparation step of the PmB.

The production process according to the invention as well as the production unit for the implementation of such a process are remarkable in that they make it possible to meet safety and environmental requirements as regards $H_2S$ emissions. In particular, the PmB production process advantageously allows to achieve a $H_2S$ concentration less than or equal to 10 ppm, preferably less than or equal to 5 ppm. The production process as well as the production unit according to the invention makes it possible to greatly reduce the exposing risks of operators to $H_2S$ during the loading and/or unloading of cross-linked bitumen/polymer compositions in tank trucks or tank cars.

The invention claimed is:

1. A process for producing a cross-linked bitumen/polymer composition with reduction in hydrogen sulphide emissions comprising the following successive steps:
   (i) preparing the cross-linked bitumen/polymer composition (PmB) in a reactor; and
   (ii) transferring a predetermined quantity of the composition from the reactor to at least one of a storage tank and directly to a loading station via a distribution line, maintaining the composition (PmB) at a temperature comprised between 100° C. and 220° C. during the transfer, carrying out a reduction in hydrogen sulphide ($H_2S$) emissions by the in-line injection of an effective quantity of a hydrogen sulphide ($H_2S$) scavenger during the transfer step (ii), the injection being carried out by continuous introduction of the hydrogen sulphide ($H_2S$) scavenger into the distribution line downstream of the reactor and, upstream of the storage tank and the loading station.

2. The process according to claim 1, wherein the distribution line comprises a transfer pump capable of generating a turbulent flow and the in-line injection is carried out upstream of the transfer pump.

3. The process according to claim 1, wherein the hydrogen sulphide ($H_2S$) scavenger is chosen from the organic metal salts, the inorganic metal salts and mixtures thereof.

4. The process according to claim 1, wherein the hydrogen sulphide ($H_2S$) scavenger is chosen from the group consisting of the metal salts of carboxylates, oxides, naphthenates, sulphonates and mixtures thereof.

5. The process according to claim 1, wherein the hydrogen sulphide ($H_2S$) scavenger metal salt of carboxylates.

6. The process according to claim 1, wherein the temperature of the cross-linked bitumen/polymer composition (PmB) during the transfer is comprised between 140° C. and 190° C.

7. The process according to claim 1, wherein the transfer comprises unloading from the reactor (the determined quantity of cross-linked bitumen/polymer composition (PmB) in the form of a channelled flow via the distribution line and the introduction of the hydrogen sulphide ($H_2S$) scavenger is carried out from the start of the flow and in an uninterrupted manner up to the end of the flow.

8. The process according to claim 1, wherein the mass ratio of hydrogen sulphide ($H_2S$) scavenger injected in-line relative to the predetermined quantity of cross-linked bitumen/polymer composition (PmB) is comprised between 0.10% and 0.35%.

9. The process according to claim 8, wherein mass ratio is comprised between 0.2 and 0.3%.

10. The process according to claim 1, wherein the preparation of the cross-linked bitumen/polymer composition (PmB) comprises:
    mixing in the reactor of 90% to 99.7% by mass of a bitumen base and 0.7% to 10% by mass of an elastomeric polymer, at a temperature comprised between 90° C. and 220° C. until a homogeneous bitumen/polymer mixture is obtained; and
    cross-linking of the bitumen/polymer mixture by the addition of 0.05 to 5% by mass of a sulphur-donor cross-linking agent and heating at a cross-linking temperature comprised between 160 and 195° C. for at least 15 minutes, the mass percentages being calculated relative to the total mass of the cross-linked bitumen/polymer composition (PmB).

11. The process according to claim 10, wherein the mixing in the reactor includes 94% to 99% by mass of a bitumen base and 1% to 6% by mass of an elastomeric polymer, at a temperature comprised between 140° C. and 190° C.

12. The process according to claim 10, wherein the sulphur-donor cross-linking agent is chosen from the group consisting of elemental sulphur, the hydrocarbyl polysulphides, sulphur-donor vulcanization accelerators and mixtures thereof.

13. The process according to claim 10, wherein the elastomeric polymer is chosen from the random or block copolymers of an aromatic monovinyl hydrocarbon and a conjugated diene.

14. The process according to claim 10, wherein the quantity of sulphur-donor cross-linking agent is comprised between 0.05 and 0.5% by mass relative to the total mass of the cross-linked bitumen/polymer composition (PmB).

15. The process according to claim 1, further comprising introducing introduction of an effective quantity of at least one additive and/or at least one fluxing agent and/or at least one diluent into the cross-linked bitumen/polymer composition (PmB) during the transfer step, and carrying out the introduction by the in-line injection into the distribution line downstream of the reactor and, upstream of the storage tank and the loading station.

16. A cross-linked bitumen/polymer composition (PmB) production unit comprising:
- a reactor equipped with a stirrer and a heater;
- a storage tank of a cross-linked bitumen/polymer composition (PmB);
- a loading station operably loading the cross-linked bitumen/polymer compositions (PmB) into at least one tank
- a distribution line flowing the composition (PmB) from the reactor to at least one of the loading station and the storage tank;
- a tank containing an $H_2S$ scavenger; and
- a transfer pump generating a turbulent flow;

the tank of $H_2S$ scavenger being connected to the distribution line by connection of a branch upstream of the reactor and downstream of the transfer pump.

17. The production unit according to claim 16, wherein the transfer pump is a draw-off pump equipped with at least one filter.

18. The production unit according to claim 16 further comprising a metering pump mounted on the branch at an outlet of the tank before the connection to the distribution line.

* * * * *